UNITED STATES PATENT OFFICE.

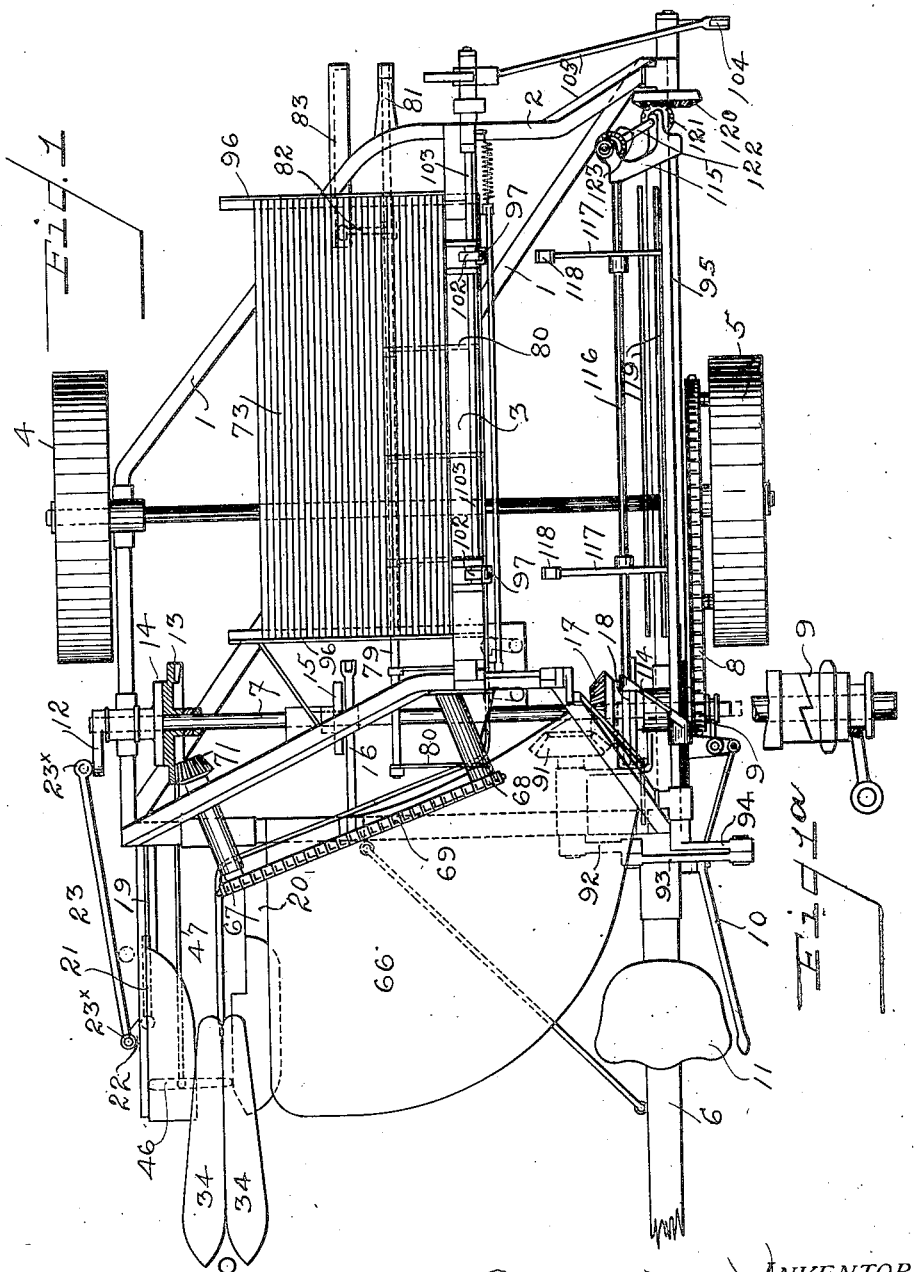

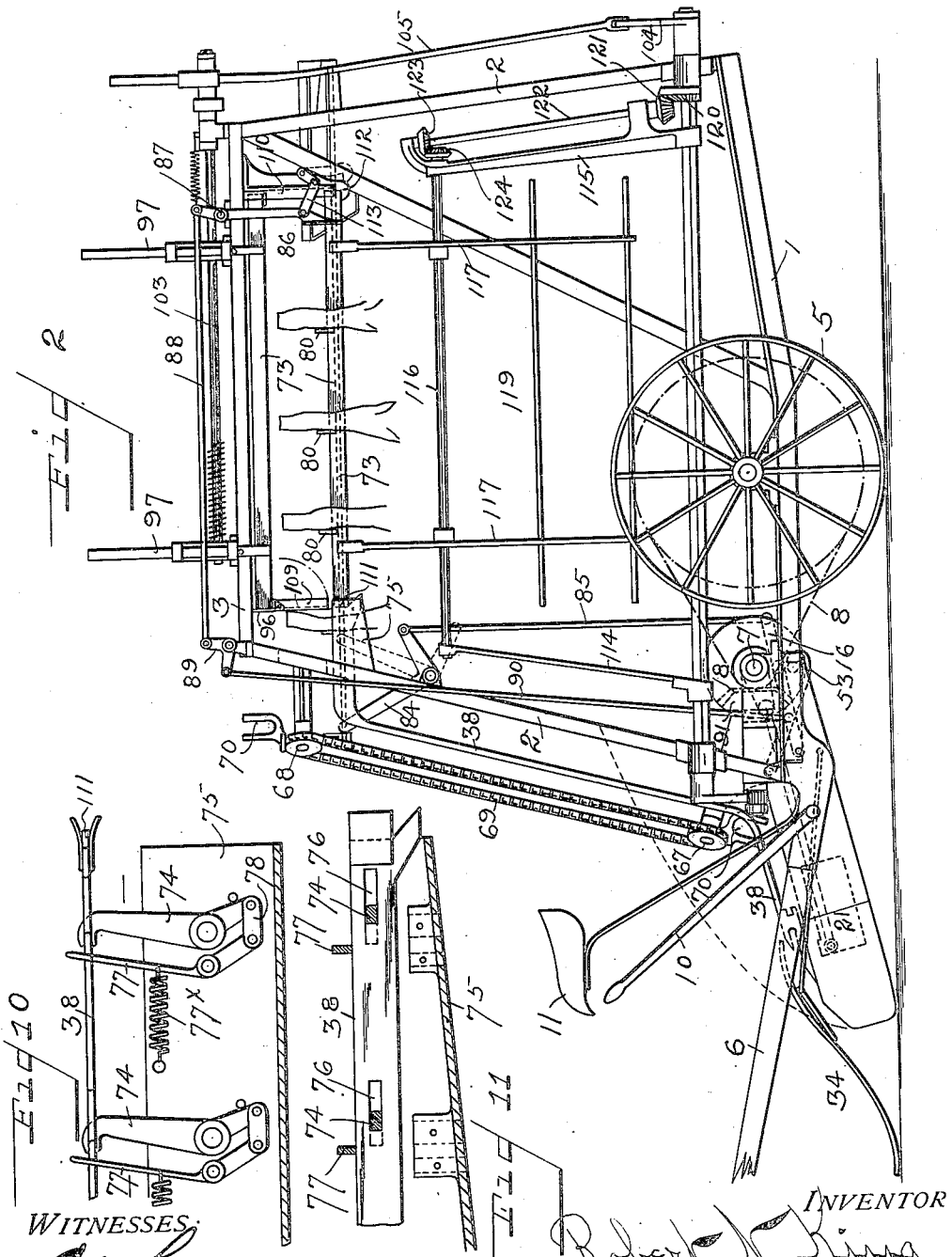

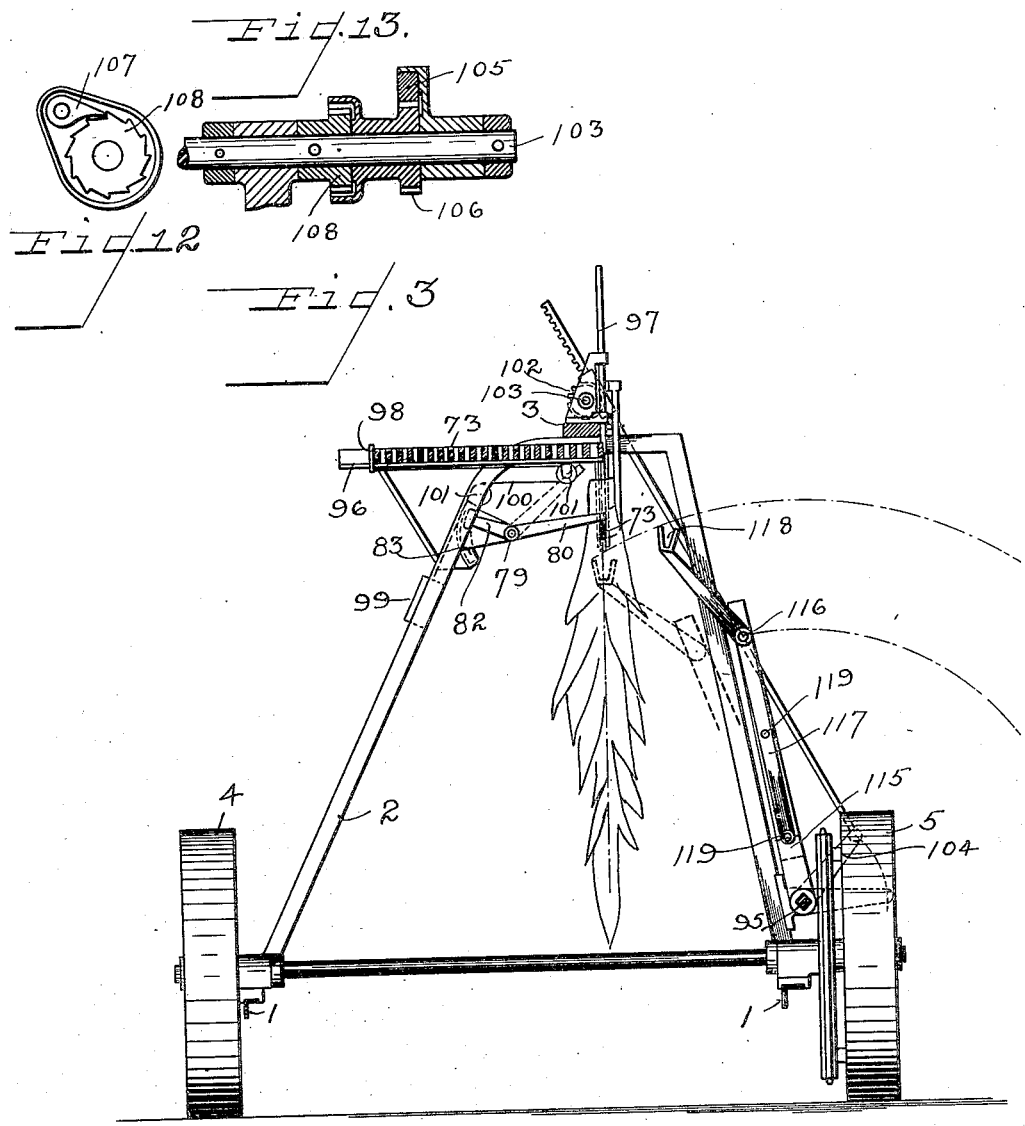

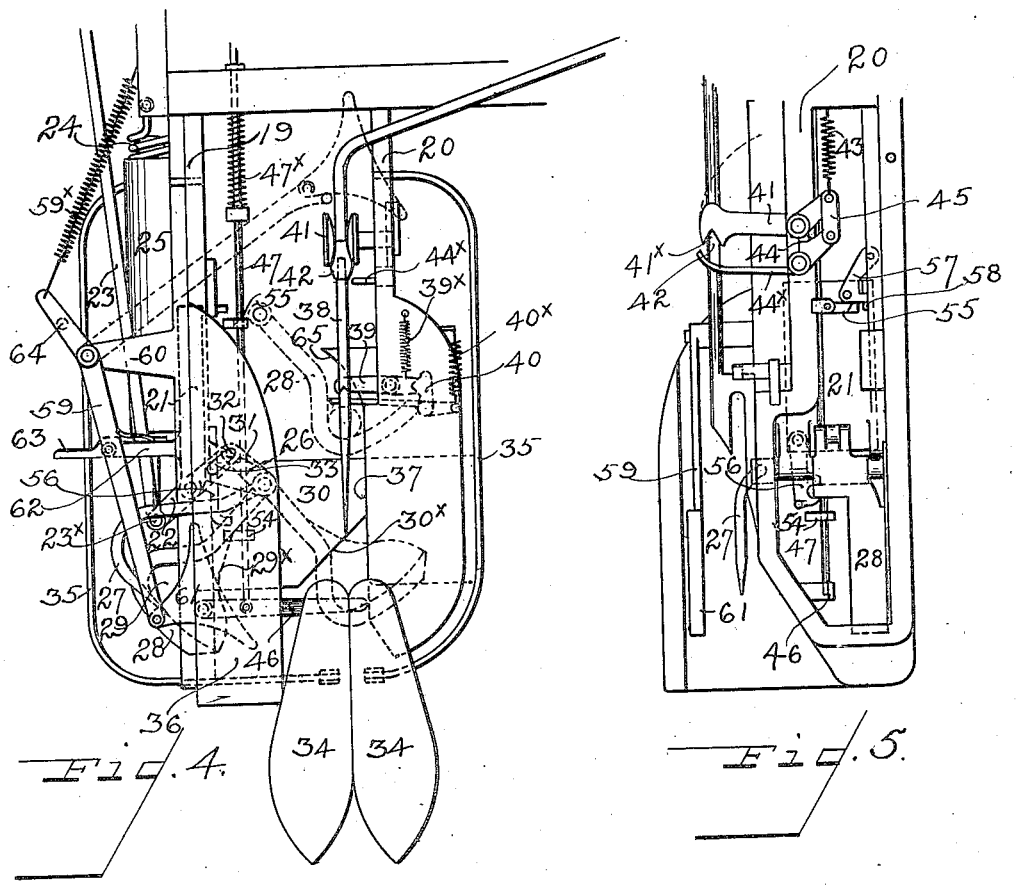

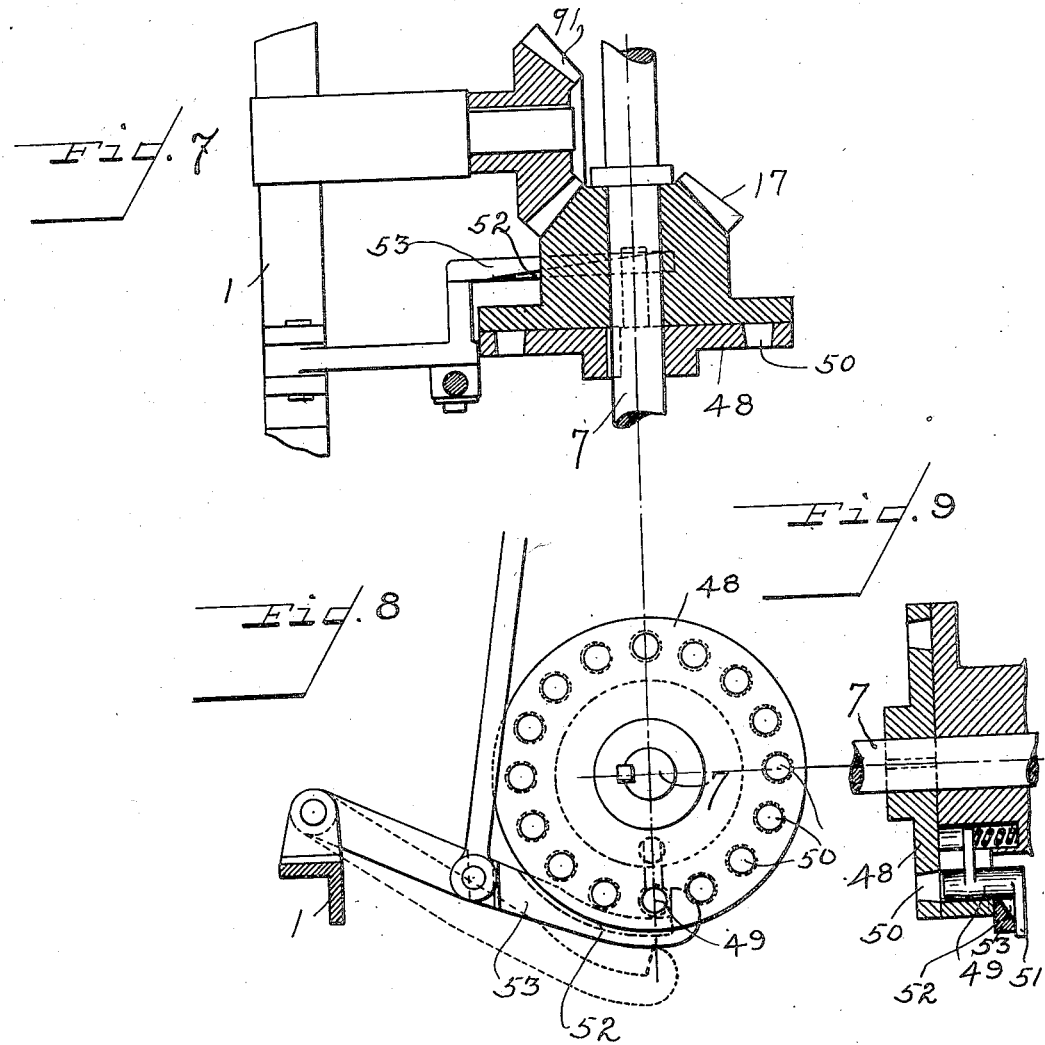

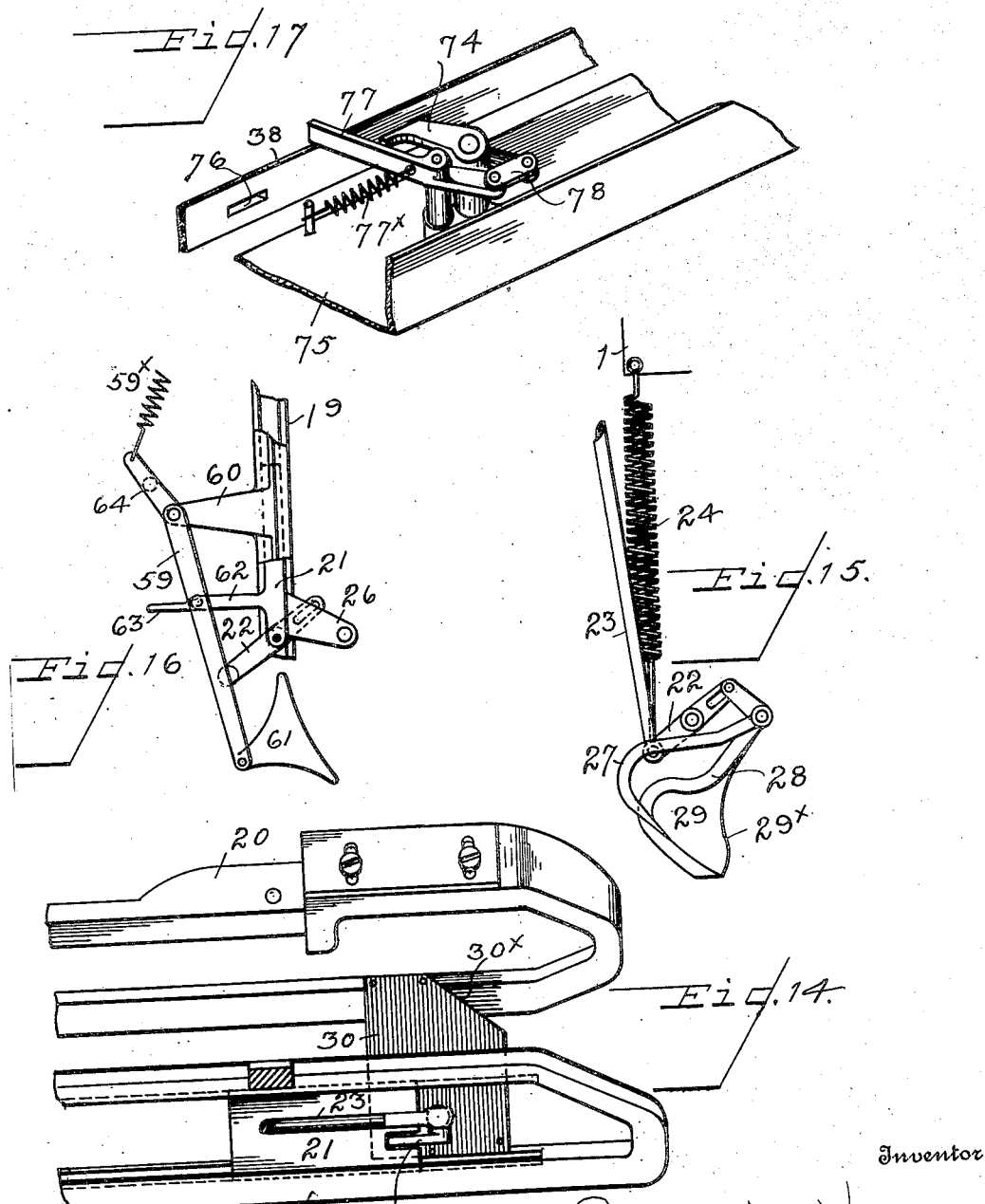

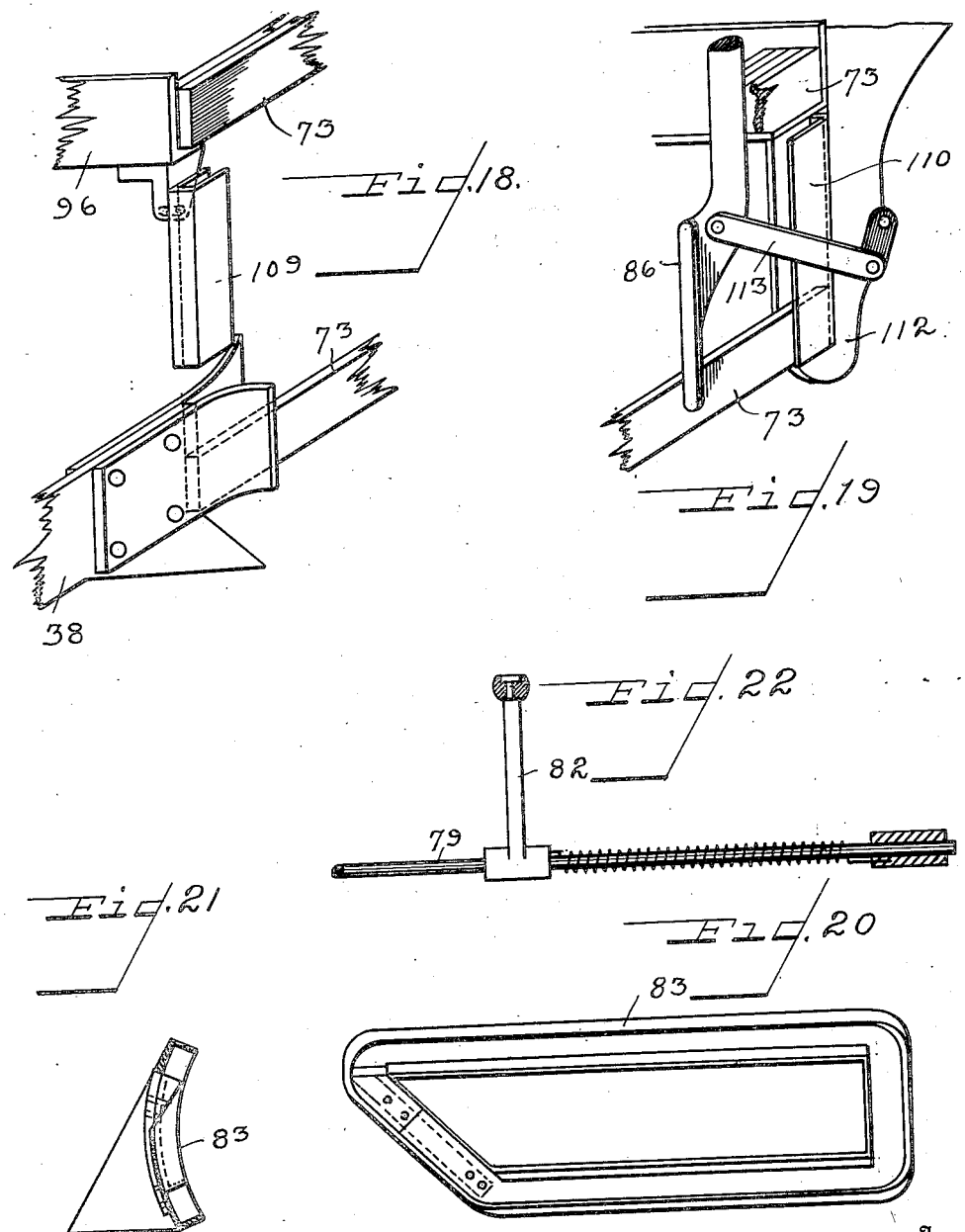

ROBERT NEWTON KING, OF DAYTON, OHIO.

TOBACCO-HARVESTER.

1,134,206.

Specification of Letters Patent. Patented Apr. 6, 1915.

Application filed February 17, 1912. Serial No. 678,269.

*To all whom it may concern:*

Be it known that I, ROBERT N. KING, a citizen of the United States, residing at Dayton, in the county of Montgomery and State of Ohio, have invented certain new and useful Improvements in Tobacco-Harvesters, of which the following is a specification.

My invention relates to harvesting machines and particularly to tobacco harvesters adapted to automatically spear or spud the harvested stalks, stringing them at regular intervals upon a lath or other support upon which they are collected for convenience in handling during the curing process.

Heretofore the operation of securing the plants upon the support or lath from which they are impaled in an inverted position has usually been performed by hand. So performed the operation is both tedious and costly and frequently results in serious injury to the leaves of the plant.

One of the primary objects of the present invention is to produce a machine capable of automatically performing the spearing or spudding operation and adapted to secure the plant in predetermined spaced relation upon a lath or other support and when a predetermined quantity of plants has been so secured to discharge the lath or support from the machine.

A further object of the invention is to simplify the structure as well as the means and mode of operation of such harvesting machines, whereby they will not only be cheapened in construction but will be more efficient in use, automatic in operation and unlikely to get out of repair.

A further object of the invention is to provide improved cutting means for severing the woody stalk of the plant and for performing the initial piercing operation and for conveying the severed stalks to the lath or other receiving member.

With the above primary and other incidental objects in view as will more fully appear in the specification the invention consists of the features of construction, the parts and combinations thereof and the mode of operation, or their equivalents, as hereinafter described and set forth in the claims.

In the accompanying drawings, Figure 1 is a plan view of the assembled machine. Fig. 1ᵃ is a detail view of the main drive clutch. Fig. 2 is a side elevation of the assembled machine. Fig. 3 is a transverse sectional view looking rearward. Fig. 4 is a detail plan view of the stalk severing and impaling devices. Figs. 5 and 6 are side and end elevations respectively of severing and impaling mechanism. Figs. 7, 8 and 9 are detail views of intermittently operated clutch devices employed to operate the stalk severing and impaling mechanism and also the support discharge mechanism at predetermined times in the sequence of operation. Figs. 10 and 11 are detail plan and side views of the yielding supporting means for the impaling needle. Figs. 12 and 13 are detail views of the actuating devices for the feeding mechanism. Fig. 14 is a detail perspective view of the forward portion of the main frame, showing the reciprocating head mounted therein. Fig. 15 is a detail plan view of the oscillatory severing device and supporting arm together with their actuating spring and pitman. Fig. 16 is a detail plan view of the pushing mechanism for initially shifting the impaled stalks upon the needle. Fig. 17 is a detail perspective view of the yielding support for the upper extremity of the needle. Fig. 18 is a detail perspective view of the forward support for the removable lath and the swinging guide, by which the lath is conducted to its receiving position. Fig. 19 is a detail perspective view of the rear support for the removable lath and the trip arm, by which the lath discharging mechanism is actuated. Figs. 20 and 21 are side and end elevations respectively of the cam guide by which the reciprocatory stalk shifting fingers are controlled. Fig. 22 is a detail plan view of a reciprocatory rod and actuating arm for the stalk shifting devices.

Like parts are indicated by similar characters of reference throughout the several views.

In constructing the machine there is employed a main frame 1 composed preferably of angle iron upon which is located a super structure comprising the upright arches 2 connected by a longitudinal bar 3. The main frame is mounted cart-like upon carrying wheels 4 and 5 and is adapted to be drawn by means of a tongue 6 or it may be propelled by means of a suitable motor mounted upon the frame in the well known manner. The carrying wheel 5 also constitutes the driving wheel by which the several moving parts are actuated.

Mounted transversely upon the main frame is the main drive shaft 7, driven from the drive or bull wheel 5 by means of a sprocket chain 8 engaging suitable sprockets upon the drive shaft 7 and the drive wheel 5. The driven sprocket upon the main shaft 7 may be engaged or disengaged from said shaft by means of a clutch 9 as shown in Fig. 1ª. This clutch is operated by means of a control lever 10 extending adjacent to the operator's seat 11.

At its extreme end the main drive shaft 7 carries a crank 12 by which the cutting and impaling devices are operated, while adjacent thereto there is loosely mounted upon the main shaft 7 a gear member 13 adapted to be engaged with the drive shaft 7 by an intermittently operated clutch 14, whereby the said gear 13 will drive the elevator or conveying devices for the severed stalks.

Carried upon a medial portion of the drive shaft 7 is a cam 15 actuating a rock lever 16 by which the stalk shifting or spacing devices are in turn actuated.

Carried upon the main shaft 7 adjacent to its opposite end is a loosely journaled gear member 17 adapted to be engaged with the drive shaft 7 by an intermittently operated clutch 18, whereby the gear member 18 will be caused to actuate the support feeding and discharging mechanism.

These several portions of the mechanism will now be described in detail. The severing and impaling devices, which are best shown in detail in detail views 4, 5 and 6, project forward of the main frame adjacent to the right hand side thereof. Projecting forward from the main frame member 1 are two substantially parallel arms 19 and 20. Located in suitable guides or ways in the arm 19 is a reciprocating head 21 carrying at its forward extremity a pivoted lever 22. Attached at one end to the pivoted lever 22 and at its opposite end to the crank 12 is a pitman 23 by which the sliding head 21 may be reciprocated within its guides or ways in the arm 19. The connections of the pitman 23 with the lever 22 and the crank 12 are preferably by means of universal or ball and socket joints as at 23ˣ.

In order that the reciprocating head 21 may be retracted with considerable force there is provided a helical retracting spring 24, one end of which is secured to the outer end of the pivoted lever 22, while the opposite end of said spring is secured to the main frame 1. The spring 24 is preferably inclosed throughout the greater portion of its length by a protective housing 25 carried upon the forward extending arm 19.

Pivotally supported upon an inward projecting arm or bracket 26 carried by the reciprocating head 21 are hook-like supporting members 27 and 28. The hook shaped supporting members 27 and 28 are fixed in their relation with each other and move in unison about the pivotal connection with the arm or bracket 26. The uppermost supporting member 27 is offset in relation with the member 28 or located somewhat back of said member. The lowermost member 28 is provided with a web 29 coincident with its lowermost surface, which web 29 is provided with a sharpened cutting edge 29ˣ, which, to sever the standing stalks, coöperates with a stationary cutting blade 30 extending intermediate the arms 19 and 20 and provided with a diagonal cutting edge 30ˣ.

The pivoted stalk supporting members 27 and 28 are in the form of a bell lever, being provided with a lateral projecting arm 31 formed integral with the members 27 and 28 and carrying a stud 32 engaging in a slot 33 in one arm of the pivoted lever 22. The construction is such that upon the initial rearward movement of the pitman 23 under the influence of the crank 12 and the retracting spring 24 the pivoted lever 22 will be oscillated about its connection with the reciprocating head 21. By the slotted engagement of the lever 22 with the arm 31 of the stalk supporting members 27 and 28 the said stalk supporting members will be oscillated about their connection with the arm or bracket 26 with great force causing the web 29 of the supporting member 28 to engage and sever the standing stalk which may be in its path. A further movement of the pitman 23 will cause a rearward reciprocation of the sliding head 21 carrying with it the stalk supporting members 27 and 28 thereby accomplishing a result hereinafter described.

Extending forward of the arms 19 and 20 are two curved shoes or runners sliding upon the ground and independently supported upon flexible arms 35. These shoes or runners 34 are formed divergent or flaring at their extremities whereby as the machine advances the flaring extremities of the respective shoes will pass upon opposite sides of the standing stalks which will force the shoes or runners 34 apart against the tension of their supporting arms 35. These shoes or runners are adapted to enter beneath the lowermost leaves of the plant and lift the said leaves as the machine advances to avoid injury thereto during the subsequent severing and spearing or impaling operation to be described. There is carried upon the forward extending arm 19 a shield 36 which protects the leaves of the plants against entanglement with the moving parts.

Carried upon the forward extending arm 20 is a rigidly secured guide or abutment 37 adjacent to which extends the sharpened extremity of an impaling needle permanently carried upon the machine. The guide or abutment 37 is preferably adjustable to and from the impaling needle 38. The impaling needle may be provided with a single alined sharpened extremity but is preferably formed with an offset bifurcated engaging extremity both arms of such bifurcated portion being sharpened and the lower arm being extended beyond the upper arm as clearly as shown in Fig. 5.

To form an abutment for the impaling needle during the impaling or spearing operation there is provided upon the forward extending arm 20 a pivoted arm 39 one end of which engages the shoulder or offset portion of the bifurcated extremity of the needle 38 in which engagement it is held by a spring 39×, while the opposite end of the lever 39 is engaged by a spring actuated detent 40. The detent 40 is in the form of a bell lever controlled by a spring 40× and is adapted to lock the arm 39 in engagement with the shoulder portion of the needle 38. The detent 40 is disengaged from the arm 39 upon the rearward reciprocation of the sliding head 21 by the engagement of the stalk supporting member 28 with said detent as shown in Fig. 4.

The impaling needle 38 is further supported by means of a bifurcated pivoted lever 41 having lateral recesses 41× in the bifurcated portion thereof within which recesses engage lateral shoulders 42 formed on the impaling needle. The pivoted arm 41 is held in engagement with the shoulders 42 of the needle by means of a spring 43 and is further locked in its movement by the engagement of a shoulder 44 on said pivoted lever 41 with a corresponding shoulder upon a second pivoted lever 44. The levers 44 and 41 are connected by a link 45 whereby a movement of the lever 44 will not only unlock the lever 41 by disengaging the shoulders 43 but will operate through the links 45 to oscillate the arm 41 out of engagement with the lateral shoulders 42 of the needle. The impaling needle 38 extends substantially horizontally to a point in the rear of the pivoted bifurcated arm 41 from where it extends diagonally upward and laterally to a point substantially level with the top of the super-structure of the main frame and thence extends rearward as hereinafter described.

Pivotally carried upon the forward portion of the arm 19 is a trip arm 46 extending beneath the shoes or runners 34 and into the path of the stalk to be harvested as said shoes pass upon either side thereof.

Attached to the trip arm 46 is a rearward extending link 47 adapted by its reciprocation to cause the operative engagement of the clutch 14. In construction the intermittently operative clutch 14 is similar to the clutch 18 which is illustrated in Figs. 7, 8 and 9. These clutches both comprise a driving member 48 secured upon the shaft 7 and a driven member which in the present instance may be the gear 13 or the gear 17 loosely mounted on the shaft 7. The driven member, either the gear 13 or 17 carries therein a spring actuated plunger 49 adapted when released to engage any one of a series of holes 50 in the driving member 48. The plunger 49 is provided with the head 51 adapted to engage a cam face 52 upon an arm 53 pivoted upon the main frame 1 and movable into and out of the path of the spring actuated plunger 49 as the driving member 48 is rotated. The extremity of the pivoted arm 53 is hook shaped to form a detent adapted to rest the movement of the driven member when the spring actuated plunger 49 has been withdrawn from the driving member by the cam like action of the cam face 52. An oscillation of the pivoted arm 53 withdraws said arm from engagement with the head 51 of the plunger 49 permitting the plunger to engage the corresponding clutch member under the influence of its actuating spring. The reciprocation of the link 47 upon the oscillation of the trip arm 46 by its engagement with the stalk to be harvested causes a corresponding operation of the pivoted arm 53 of the clutch 14 thereby withdrawing said arm 53 from its engagement with the spring actuated member 49 permitting said clutch 14 to operate to engage the crank 12 and the gear 13 with the drive shaft 7. It is to be understood that the crank and gear are so connected as to operate in unison, causing the severing, impaling and elevating mechanism to operate only when a stalk is to be harvested.

The movement of the link 47 is against the tension of a retracting spring 47×. The reciprocating link 47 carries two tappets 54 and 55. The reciprocation of the link 47 causes the tappet 55 to engage and release a pivoted latch 56 which normally engages and locks the stalk supporting member 28 in its normal or set position. A slight further movement of the link 47 causes the tappet 55 to engage and release a pivoted latch 57 which engages a lip 58 upon the reciprocating head 21 to normally lock said head against rearward movement. The operation of this portion of the mechanism is as follows; as the machine advances the shoes or runners 34 pass upon either side of the standing stalk which as the machine continues to advance enters between said shoes or runners 34 forcing said shoes outward against the tension of the supporting arms 35, and finally engages and oscillates the trip arm 46. The oscillation of the trip arm 46 operates through the links 47 to operatively engage the clutch 14 to connect the several parts with the main drive shaft 7 and at the same time the tappet 54 disengages the latch 56 thereby releasing the stalk supporting members 27 and 28. The stalk supporting members 27 and 28 upon their disengagement by the latch 56 spring inward under the influence of the retracting spring 24 and the retractory movement of the pitman 23 causing the cutting edge 29ˣ of the web 29 to coöperate with the cutting edge 30ˣ of the stationary knife 30 to sever the stalk which is forced laterally into contact with the stationary abutment or guide 37, against which it is pressed by the member 28 with the severed end of the stalk resting upon the web portion 29 of said member. The stalk engaging member 28 engages the stalk in a plane below the level of the impaling needle 38 while the stalk supporting member 27 engages the stalk in a plane above said needle. The stalk supporting member 27 being offset in relation to the member 28 engages and supports the lower leaves of the plant without puncturing or injuring the leaves.

It is to be understood that the stationary guide or abutment 37 is adjusted away from the impaling needle 38 a distance substantially equal to one half the diameter of the average stalk to be harvested. The stalk having been severed and carried laterally to a position in contact with the guide or abutment 37 by the swinging action of the stalk supporting members 27 and 28, the sliding head 21 is carried rearward by the continuous movement of the pitman 23 and the action of the retracting spring 24 and after the pivoted lever 22 has been oscillated to actuate the supporting and severing members 27 and 28. Upon its retrograde movement the sliding head 21 carries with it the stalk supporting members 27 and 28 which in turn carry the severed stalk, drawing the same along the guide or abutment 37 and upon the sharpened extremity of the impaling needle 38. As before stated the impaling needle 38 is so adjusted in relation to the guide or abutment 37 that it will engage and pierce the stalk substantially upon the center or medial line. As shown in Fig. 5 the stalk will be engaged and pierced by the lowermost or longest tine of the bifurcated portion of the needle extremity and after such extended tine has passed through the stalk the shorter pointed tine will engage the stalk at a higher point and pierce the same thereby enlarging the opening made by the initial tine. As the sliding head 21 moves rearward the stalk supporting members 27 and 28 draw the severed stalks upon the sharpened extremities of the needle until the supporting member 28 engages and oscillates the detent 40 to release the needle supporting arm 39 whereupon the stalk continuing to move upon the needle engages and oscillates the arm 39 against the tension of its spring 39ˣ pressing said arm out of the path until the stalk has moved there beyond whereupon the spring 39ˣ will return the arm 39 into engagement with the shoulder of the needle and the detent 40 will be reengaged with the arm 39 to lock it in engaged position.

To advance the stalks upon the needle from the point where it is disengaged by the stalk supporting members 27 and 28 to the point where it will be engaged by the elevator or conveyer mechanism hereinafter to be described, there is provided a pusher arm 59 pivoted upon an outward projecting arm or bracket 60 carried by the forward extended arm 19. The pusher arm 59 is provided with a pivoted head 61 to engage the stalk and as the arm 59 is oscillated, advance the stalk upon the needle 38. The pusher arm 59 is provided with a retracting spring 59ˣ. To oscillate the pusher arm 59 there is provided upon the sliding head 21 an outward projecting arm 62 having a pivoted spring actuated extension 63 adapted to yield against its spring when pressed in one direction but to resist movement when pressed in the opposite direction.

There is provided in one arm of the push lever 59 a stud 64 projecting into the path of the pivoted spring actuated extension 63 of the arm 62. The construction is such that upon the retrograde movement of the sliding head 21 the pivoted extension 63 will engage the stud 64 but will yield against the tension of the spring thereby permitting the arm 62 and its extension 63 to pass beyond the stud 64.

Upon the return or forward movement of the sliding head 21 the pivoted extension 63 of the arm 62 will engage the stud 64 and as the head 21 continues to move the extension 63 will oscillate the pusher lever 59 to cause the head 61 to engage and advance the impaled stalk upon the needle 38. The arm 62 and its extension 63 will continue to actuate the pusher lever 59 until the stud 64 reaches a position where it slips over the extremity of the pivoted extension 63 whereupon the retractory spring 59ˣ will return the pusher lever 59 to its normal position. The impaled stalk having been advanced by the pusher arm 59 to the point where the impaling needle is inclined upward and laterally the stalk will be engaged by the elevating or conveyer mechanism which will continue to advance the stalk up the inclined portion of the needle. It is to be understood however that as the stalk is being advanced by the pusher lever 59 the butt of the stalk projecting beneath the impaling needle 38 engages a curved or cam like portion 65 of the guide or abutment 37 whereby the lower portion of the stalk is deflected inward thereby turning the top of the severed stalk outward to a recumbent position upon a shield or guiding surface 66. The leaves of the stalk will rest upon and be supported by the shield 66 as the stalk advances throughout the length of the impaling needle 38. Mounted upon suitable brackets upon the main frame of the machine are two sprocket wheels 67 and 68 upon which is carried a sprocket chain 69 having thereon U shaped fingers 70 which straddle the inclined portion of the needle 38. The sprocket 67 is driven from the gear member 13 upon the main drive shaft 7 by means of the pinion 71 which meshes with said gear member 13. The fingers 70 are adapted to engage the impaled stalk in the position in which it is left by the pusher arm 59 and as the sprocket chain 69 travels upward the fingers 70 push the impaled stalk up the inclined portion of the needle 38. At its upper extremity the needle 38 is bent rearward and terminates in a bifurcation or pocket in which engages one end of a supporting lath 73 which forms a detachable continuation of the permanent needle 38. A supply of the removable laths or supports 73 is carried in a suitable receiver upon the super structure of the main frame and adapted to be fed singly by lath feeding mechanism hereinafter described from said receiver into a position in alinement with the needle 38 to receive the impaled stalks.

The needle 38 is supported at its upper extremity by a double set of supporting devices adapted to yield to permit the passage of the impaled stalk. These yielding supporting devices are shown in detail in Figs. 10 and 11. Each of the supporting devices comprises a pivoted arm 74 carried upon a bracket 75 projecting from the frame of the machine. The arm 74 extends through a slot 76 in the needle 38. The extremity of the pivoted arm 74 is notched or recessed whereby it will engage both sides of the needle 38 at one end of the slot 76. The engagement of the notched or recessed extremity with the opposite sides of the needle 38 prevents lateral variation of the needle while the engagement of the arm within the slot prevents vertical displacement thereof. Pivotally carried upon the bracket 75 adjacent to the supporting arm 74 is a trip arm 77 extending beyond the needle 38 and across the path of the advancing stalks. When the impaled stalk engages the trip arm 77 it oscillates said arm against the tension of its retracting spring 77ˣ. The oscillation of the trip arm 77 is transmitted through the link 78 to the supporting arm 74 which is thereby oscillated in unison with the trip arm 77 to withdraw the notched or recessed end of the supporting arm 74 from engagement with the needle. As the impaled stalk continues to advance upon the needle it passes beyond the range of movement of the trip arm 77 whereupon the retracting spring 77ˣ returns the trip arm 77 and with it the arm 74 to normal position where the arm 74 again engages the impaling needle. The impaled stalk continuing to advance then engages and operates the second set of needle supporting devices in exactly the same manner. The construction is such that the impaling needle will at all time be supported by one set of the holding devices shown in Fig. 10. While the first set is disengaged to permit the passage of the stalk the needle is being supported by the second set of such holding devices and before the second set of such holding devices are disengaged from the needle the first set of such holding devices is then returned to its engagement therewith.

The impaled stalks are shifted from the upper rear portion of the impaling needle 38 onto the removable lath or support 73 and are slidingly moved throughout the length of the lath to proper spaced relation thereon by means of a reciprocating shift rod 79 carrying a series of spaced fingers 80. The shift rod 79 is mounted in suitable bearings 81 upon the main frame within which bearings it is capable of a reciprocatory and also oscillatory movement. The fingers 80 carried by the reciprocating rod 79 extend transversely to point beyond the rear portion of the impaling needle 38 and the lath or other support 73 and across the path of travel of the stalks. The reciprocating rod 79 also carries an arm 82 engaging in a suitable cam slot in a plate or housing 83 carried on the main frame. The cam slot in the member 83 is so shaped that upon the rearward movement of the rod 79 the fingers 80 carried thereby will engage and shift the impaled stalk upon the lath 73 by pushing said stalks in advance of the fingers 80. However upon the return movement of the reciprocating rod 79 the arm 82 enters a portion of the cam slot which causes the reciprocating rod 79 to be oscillated, thereby lifting the fingers 80 above the level of the butts of the impaled stalks while said rod is being returned to its original position. At the limit of the return movement of the shift rod 79 the fingers 80 are again returned to position to engage the impaled stalk by the movement of the arm 82 within the said cam slot.

The shift rod 79 is operated at proper intervals by means of a bell lever 84 pivoted upon the main frame one arm of which engages said shift rod 79 while the other arm of the bell lever is connected by a link 85 with the rock lever 16 which is in turn actuated by the cam 15 carried upon the main drive shaft 7.

As the impaled stalks are shifted upon the lath or support 73 of their final position the rearmost or terminal stalk will engage a trip lever 86 pivoted upon the main frame at 87 and projecting into the path of the moving impaled stalk. The trip lever 86 is connected by a link 88 with a bell lever 89 pivoted upon the main frame which in turn is connected by a link 90 with the trip lever 33 of the clutch 18 carried upon the main drive shaft 7. The oscillation of the trip lever 86 by the movement of the rearmost stalk to its final position operates through the link 88, the bell lever 89, the link 90 and the trip lever 33 to cause the clutch 18 to operatively engage the gear 17 with the main shaft 7 and thereby actuate the lath feeding and discharging mechanism. The gear 17 meshes with a corresponding gear 91 upon the shaft of which is carried a crank 92 connected by a link 93 with a second crank 94 secured upon the extremity of a longitudinal rock shaft 95.

A supplemental supply of removable laths 73 is carried in suitable guides or supports 96 upon the top of the main frame. The laths 73 are fed singly from the support 96 in a downward direction by the means of vertically moving plungers 97. The supply of laths within the support 96 is advanced as each lath is fed therefrom by means of a follower 98 operated by a weight 99 attached to a cord 100 passing over pulleys 101 whereby the weight 99 will cause the follower 98 to press the supply of laths toward the ejectors or plungers 97. The plungers or ejectors 97 have a series of rack teeth formed in one face thereof and engaged by gear pinion 102 carried upon a longitudinal shaft 103. The rock shaft 95 carries at its rear end an arm 104 to which is connected an actuating bar 105 having near its extremity a series of rack teeth engaging a gear pinion 106 mounted adjacent to the rear extremity of the rock shaft 103. The gear 106 is loosely journaled upon shaft 103 and carries upon an extension of said gear pinion a ratchet pawl 107 adapted to engage a ratchet wheel 108 secured upon the shaft 103. The construction is such that the actuating bar 105 may be operated in one direction independent of the rock shaft 103 but when operated in the opposite direction will rotate said shaft 103. As the actuating bar 105 is operated upward the gear pinion 106 will rotate free upon the shaft 103, the pawl 107 riding freely over the ratchet wheel 108. However upon a downward movement of the actuating bar 105 the gear pinion 106 will be actuated in the opposite direction causing the pawl 107 to engage the ratchet wheel 108 and thereby rotate the shaft 103. This movement of the shaft 103 carries with it the gear pinions 102 which engage and reciprocate the plungers or ejectors 97. Inasmuch as the pinion 106 rotates free upon the return movement of the actuating bar 105 a retractory spring 97× is provided upon the shaft 103 to return the plungers 97.

The plungers or ejectors 97 are so shouldered adjacent to their lower ends where they will engage the foremost lath or support carried upon the supports or guides 96 and as the plunger is forced downward will carry the lath from the support 96 downward to a position in alinement with the rear end of the impaling needle 38.

The lath 73 during its downward movement from the support 96 to its operative position in alinement with the needle 38 is guided by means of suitable vertical guides 109 and 110. The guide 109 at the forward portion of the main frame is pivoted to permit the guide to yield and swing out of the path of the advancing impaled stalk.

When in its operative position the support or lath 73 engages at one end in the recess or pocketed extremity 111 of the impaling needle 38 while the opposite end is supported by a swinging hook 112. The supporting hook 112 is connected by a link 113 with the oscillating trip lever 86 whereby the movement of the trip lever 86 which serves to operatively connect the clutch 18 to actuate the lath feeding and discharging mechanism as hereinbefore mentioned and also operates the hook support 112 to release the support or lath 73 upon which the predetermined quantity of stalks has been collected.

In order to discharge the support 73 and the stalks impaled thereon from the machine there is provided for receiving the loaded lath when it is released by the disengagement of the hook member 112, mechanism adapted to lift the lath and its attached stalks laterally over the carrying wheel 5 and lay the stalks gently upon the ground beyond the path of the machine as it makes its succeeding trip across the field. This lath discharging mechanism includes two arms 114 and 115 rigidly secured upon the rock shaft 95 and adapted to oscillate therewith. Journaled in suitable bearings in the arms 114 and 115 is a shaft 116 carrying two parallel arms 117 which are bifurcated at their upper extremities as shown at 118 and are connected one with the other by transverse rods or bars 119 forming an oscillating frame journaled in the bearings in the arms 114 and 115.

Rigidly secured concentric with the bearings of the rock shaft 95 in the main frame of the machine is a gear segment 120 with which meshes a gear pinion 121 carried upon a shaft 122 journaled in suitable bearings in the arm 115. The shaft 122 carries at its other end a gear pinion 123 meshing with a corresponding gear pinion 124 upon the extremity of the shaft 116. The construction is such that upon the oscillation of the shaft 95 and with it the arms 114 and 115, the gear pinion 121 is carried about the gear pinion 120 and the shaft 122 given a rotary movement which is transmitted by the gear members 123 and 124 to the shaft 116. By this means the shaft 116 and the frame formed by the arms 117 and the transverse bars 119 is oscillated in its bearings in the arms 114 and 115 independent of the shifting movement due to the oscillation of said arms 114 and 115.

In their normal position as shown in Fig. 3 the oscillating arms 114 and 115 and the swinging frame arm 117 are located to one side of and out of the path of the impaled stalks as they are slidingly adjusted upon the support or lath 73. The crank members 92 and 94 are so adjusted in relation to each other that upon the operative engagement of the clutch 18 the initial movement of the crank 94 will be inward or toward the impaled stalks carrying the operative arms 114 and 115 and the swinging frame inward to the position indicated by dotted lines in Fig. 3 with the bifurcated ends of the arms 117 immediately below the support 73 ready to receive said support when released by the supporting member 112. The further rotation of the crank 92 operating through the link 93 and the crank 94 causes the rock shaft 95 and the operating arms 114 and 115 to swing outward. As the arms 114 and 115 swing outward the gear pinion 121 traveling over the stationary gear member 120 causes the swinging frame comprising the arms 117 and transverse bars 119 to rotate upon the bearings of the shaft 116 of said arms carrying with it the lath or support 73 which is then engaged in the bifurcated extremity 118 of the arm 117 and the impaled stalk carried by said support or lath and which rests upon the transverse bars 119. As the arms 114 and 115 continue to oscillate outward the swinging frame reverses itself lifting the impaled stalk over the carrying wheel 5 and deposits the lath and impaled stalk gently upon the ground at one side of and beyond the path of travel of the machine. As the swinging frame reaches its final position the lath 73 is disengaged from the bifurcated extremity 118 by gravity. By this means the support and the attached stalk are automatically removed from the machine when a predetermined number of plants have been secured upon the support, the plants being supported during their discharge by the swinging frame whereby they will not be bruised or mutilated by coming in contact with the carrying wheel 5 or the diving chain 8 and will be gently deposited upon the ground without injury to the plant.

While in order to comply with the statute, the invention has been described in language more or less specific as to certain structural features, it is to be understood that the invention is not limited to any specific details, but obviously is susceptible to modifications in its form, proportion, detail construction and arrangement of parts without departing from the principle involved or sacrificing any of its advantages. It is therefore to be understood that the means and mechanism herein described comprise but one mode of putting the invention into effect and the invention is therefore claimed broadly in any of its possible forms or modifications within the scope of the appended claims.

Having thus described my invention, I claim:

1. In a harvesting machine, a traveling main frame, severing devices for the stalks, a removable support for the severed stalks carried upon the main frame in a plane above that of the severing devices, and an inclined needle extending from a point adjacent to the severing devices to the removable support with which it registers, and means for shifting the impaled stalks throughout the length of the needle onto the support, substantially as specified.

2. In a harvesting machine, a traveling main frame, stalk severing means carried thereby, a reciprocating supporting member for the stalk to be harvested, means to thrust said supporting member to a position to engage the forward side of the stalk to be harvested prior to the severing thereof, means to retract said supporting member in relation to the main frame and an impaling needle projecting in proximity to the severing devices and into the path of the supporting member upon which the stalk is drawn by the retrograde movement of the support.

3. In a harvesting machine, a traveling main frame, stalk severing and impaling devices, a reciprocating head, stalk engaging means carried by the head and capable of movement laterally into and out of alinement with the stalk in addition to its reciprocatory movement in unison with the head and adapted to form an abutment for the stalk during the stalk impaling operation, actuating means for moving the stalk engaging means laterally into alinement with the stalk as the reciprocating head approaches the limit of its stroke in one direction, and for withdrawing the stalk engaging means from alinement with the stalk as the said head approaches the opposite limit of its stroke.

4. In a harvesting machine, a traveling main frame, stalk severing devices, and an impaling needle carried on the frame, means for conveying the impaled stalk a limited distance upon the needle in upright position, and means for rotating the stalk about the impaling needle to recumbent position, substantially as specified.

5. In a harvesting machine, a traveling frame, stalk severing devices carried thereby, a support upon which the severed stalks are impaled, a reciprocating member extending adjacent to and parallel with the support, fingers carried by the reciprocating member adapted to simultaneously engage all the impaled stalks and advance them upon the support as the member is reciprocated in one direction, but inoperative when the member is reciprocated in the opposite direction.

6. In a harvesting machine, a traveling main frame, a reciprocating head, a swinging stalk severing device carried by said head, actuating means adapted by its initial movement to cause a swinging movement of the stalk severing means and by an additional movement to cause a reciprocatory movement of the head, and an impaling needle adapted to receive the stalk, substantially as specified.

7. In a harvesting machine, a traveling main frame, a reciprocating head, a pivoted lever carried by said head, a movable stalk severing member actuated by the oscillation of the said lever, a spring adapted by its initial operation to oscillate the lever to actuate the stalk severing device, and by further movement to reciprocate the head, substantially as and for the purpose specified.

8. In a harvesting machine, a traveling main frame, a spring actuated stalk severing device, means for holding said severing device in its set position with the spring under tension, and tripping mechanism operated by its engagement with the stalk to be harvested for releasing the stalk severing mechanism, substantially as specified.

9. In a harvesting machine, a traveling main frame, a sliding head, a movable stalk severing member carried by said head, a reciprocating link adapted by its initial movement to actuate said severing member and by an additional movement to reciprocate the head, substantially as and for the purpose specified.

10. In a harvesting machine, a traveling main frame, a reciprocating head, stalk engaging means carried by said head, actuating means for reciprocating the head adapted by its initial movement to cause the engagement of said engaging means with the stalk and by a further movement adapted to reciprocate the head and an impaling needle extending into the path of the stalk, substantially as specified.

11. In a harvesting machine, a traveling main frame, stalk severing devices, stalk engaging means, actuating means therefor adapted to move the engaging means into engagement with the forward side of the stalk, and thereafter to reciprocate such stalk engaging means, and an impaling needle projecting into the path of the stalk upon which the stalk is projected by the reciprocatory movement of the stalk engaging means, substantially as specified.

12. In a harvesting machine, a traveling main frame, stalk severing means comprising a movable sharpened plate having an arcuate flange projecting upward from said cutting plate and adapted to engage the side of the severed stalk while the butt thereof rests on the cutting plate, whereby the severed stalk will be carried with the severing device throughout a given path of travel, substantially as specified.

13. In a harvesting machine, a traveling main frame, stalk severing means comprising a movable knife, a hook shaped supporting member arranged above the plane of the knife and moving in unison therewith, said supporting member being adapted to engage the stalk and convey it laterally after severing, while the stalk remains in an upright position, substantially as specified.

14. In a harvesting machine, a traveling main frame, stalk severing devices, a needle upon which the stalks are to be impaled, a fixed guide located adjacent to the needle and extending parallel therewith and beyond the extremity of the needle, means for transporting the severed stalk while pressing it into engagement with the said guide, thereby engaging the stalk with the needle in predetermined relation.

15. In a harvesting machine, a traveling main frame, stalk severing devices, a needle upon which the stalks are to be impaled, a guide for the severed stalks adapted to center the stalks in relation to the needle whereby the needle will be caused to engage the stalk on substantially the medial line, said guide being adjustable to and from the needle to accommodate stalks of different diameters, said guide being adapted to be fixed in its adjusted position, substantially as specified.

16. In a harvesting machine, a traveling main frame, stalk severing devices, an impaling needle adapted to pierce the stalk, an extension of said needle extending upward and rearward from the severing devices, and means for sliding the impaled stalks throughout the length of said needle extension to a receiver, substantially as specified.

17. In a harvesting machine, a traveling main frame, stalk severing devices, an impaling needle, a guide for the severed stalk and means for automatically pressing the severed stalk laterally into engagement with the guide for centering it in relation with the impaling needle and means for simultaneously shifting the stalk along said guide and onto the protruding end of the needle, substantially as specified.

18. In a harvesting machine, a traveling main frame, stalk severing devices, and stalk impaling means, of two parallel shoes yieldingly pressed toward each other and adapted to pass on opposite sides of the standing stalk to elevate the lowermost leaves above the lever of the severing and impaling devices, substantially as specified.

19. In a harvesting machine, a traveling main frame, stalk severing devices, an impaling needle, a stalk support for the severed stalk, said stalk support and impaling needle being relatively adjustable one toward the other, a guide for the stalk to and from which the stalk support is movable in a transverse direction and with which the support coöperates to center the stalk in relation with the needle.

20. In a harvesting machine, a traveling main frame, stalk severing devices, an impaling needle, means for causing the stalk to be impaled thereon, and a guide engaged by impaled stalks and unalined with the impaling needle adapted to cause the stalks to be oscillated about the impaling needle.

21. In a harvesting machine, a traveling main frame, stalk severing devices, an impaling needle, a cam shaped guide for the impaled stalks extending from a point at one side of the plane of the needle to a point at the opposite side of the plane of the needle in a position spaced away from the needle with which the stalks engage and by which the stalks are oscillated about the needle after being impaled thereon.

22. In a harvesting machine, a traveling main frame, stalk severing devices, an impaling needle, and a guide for the stalks so located in relation to the needle as to center the severed stalks in alinement with the needle, a stalk supporting member adapted to press the stalk into engagement with the guide and means to reciprocate the said supporting member whereby the stalk will be shifted along said guide and by such shifting movement thrust upon the needle, substantially as specified.

23. In a harvesting machine, a traveling main frame, stalk severing devices, a removable hanger upon which the severed stalks are collected, an oscillatory carrier, a reversible frame in said carrier on which the hanger and collected stalks are carried, and means for simultaneously oscillating the carrier and reversing the frame to discharge the collected stalks.

24. In a harvesting machine, a traveling main frame, stalk severing devices and stalk impaling devices, a removable support upon which the impaled stalks are collected, discharge mechanism for the support including oscillating arms, a swinging frame journaled in said arms and adapted to receive the support and collected stalks.

25. In a harvesting machine, a traveling main frame, stalk severing devices, and stalk impaling devices, a removable support upon which the impaled stalks are collected, discharge mechanism for the support comprising oscillating arms, a swinging frame journaled in said arms, and actuating means whereby an oscillatory movement of the said arms will cause a swinging movement of the frame in unison therewith, said frame being adapted to receive the support and collected stalks.

26. In a harvesting machine, a traveling main frame, stalk severing devices, and stalk impaling devices, a removable support upon which the impaled stalks are collected, discharge mechanism for the support comprising oscillating arms, a swinging frame journaled in said arms, a gear member carried on the main frame, a second gear member carried by one of the oscillating arms and meshing with the first gear member, and an operating connection between the second gear and the swinging frame whereby the said frame may be oscillated independent of its oscillatory movement due to the oscillation of its support, substantially as specified.

27. In a harvesting machine, a traveling main frame, stalk severing devices, and stalk impaling devices, a removable support upon which the impaled stalks are collected, discharge mechanism for the support comprising oscillating arms, a swinging frame journaled in said arms, a stationary gear member carried on the main frame, a shaft member journaled on bearings on one of the oscillating arms, a gear member carried by said shaft and meshing with said stationary gear member, a gear member carried by the swinging frame and a second gear member carried by said shaft and meshing with the gear of the swinging frame, whereby an oscillatory movement of the arm and gear members carried thereby in relation to the stationary gear member will be transmitted to the swinging frame to oscillate said frame upon its bearings in the oscillating arms and independent of the oscillation thereof, substantially as specified.

28. In a harvesting machine, a traveling main frame, stalk severing means, a stalk impaling needle, a stop arm normally engaging the needle and forming an abutment therefor, means for locking said arm in engaged position and means for automatically releasing said arm whereby the arm may yield to permit the passage of an impaled stalk, substantially as specified.

29. In a harvesting machine, a traveling main frame, stalk severing means, a stalk impaling needle, offset shoulders formed on said needle, a pivoted supporting member engaging said shoulders to support the needle, a trip lever extending into the path of the impaled stalk and operating means between the trip and supporting member whereby the engagement of the impaled stalk with the trip will cause the withdrawal of the supporting member from the needle.

30. In a harvesting machine, a traveling main frame, stalk severing means, an unalined stalk impaling needle extending horizontally at a point adjacent to the severing means, thence upward at an inclination to the horizontal thence horizontal an additional length, and means for shifting the impaled stalks throughout the length of the unalined impaling needle, substantially as specified.

31. In a harvesting machine, a traveling main frame, stalk severing devices, an impaling needle, an abutment for the severed stalk fixed in its relation with the needle adapted to gage the position of the stalk during the impaling operation, and a movable stalk engaging member adapted to press the severed stalk against the abutment to center the stalk in relation with the needle, and means for causing the needle to be extended through the stalk while the latter is maintained between the stalk engaging member and abutment.

32. In a harvesting machine, a traveling main frame, stalk severing devices, an impaling needle, oppositely disposed stalk engaging members variable in their relation one with the other between which the stalk is clamped in a position alined with the needle, and means for causing the needle to be extended through the stalk while the latter is maintained in alinement therewith by said stalk engaging members.

33. In a harvesting machine, a traveling main frame, a stalk severing device, a pivotal support for the severed stalks, means for conveying the pivotally supported stalks through a predetermined path of travel, and a guide member for the stalks unalined with the path of travel of the stalks with which the stalks engage and by which the stalks will be oscillated about their pivotal connection.

34. In a harvesting machine, a traveling main frame, a stalk severing device, a rotatable supporting frame upon which the severed stalks are received prior to their discharge from the machine, a carrier for the rotatable frame, means to shift the carrier to project the rotatable frame beyond the frame of the machine, and means to rotate the frame in relation to the carrier to discharge the severed stalks therefrom.

35. In a harvesting machine, a traveling main frame, stalk severing devices, a variable frame upon which the severed stalks are received prior to their discharge from the machine, said supporting frame being capable of simultaneous oscillatory and rotary movement about different axes of oscillation, and means for simultaneously oscillating the frame about one axis and rotating it about a second axis to discharge the severed stalks.

In testimony whereof, I have hereunto set my hand this 10 day of February 1912.

ROBERT NEWTON KING.

Witnesses:
 HERBERT R. SIMONDS,
 DAISY MAE CRAWFORD.